(12) United States Patent
Sakai

(10) Patent No.: US 6,964,500 B2
(45) Date of Patent: Nov. 15, 2005

(54) PLANAR LIGHT SOURCE DEVICE, LIQUID CRYSTAL DISPLAY APPARATUS, AND DISPLAY APPARATUS

(75) Inventor: Seiji Sakai, Kikuchi-gun (JP)

(73) Assignee: Advanced Display Inc., Kikuchi-gun (JP)

(*) Notice: Subject to any disclaimer, the term of this patent is extended or adjusted under 35 U.S.C. 154(b) by 63 days.

(21) Appl. No.: 10/700,667

(22) Filed: Nov. 5, 2003

(65) Prior Publication Data

US 2004/0119908 A1    Jun. 24, 2004

(30) Foreign Application Priority Data

Dec. 18, 2002    (JP) .............................. 2002-366013

(51) Int. Cl.[7] .............................................. F21V 8/00
(52) U.S. Cl. ...................... 362/276; 362/612; 362/613; 349/68
(58) Field of Search .............................. 362/27, 29–30, 362/31, 276, 330, 561, 802; 349/68

(56) References Cited

U.S. PATENT DOCUMENTS

| | | | | |
|---|---|---|---|---|
| 5,537,229 A | * | 7/1996 | Brandestini et al. | 358/509 |
| 5,608,837 A | * | 3/1997 | Tai et al. | 385/146 |
| 6,069,676 A | * | 5/2000 | Yuyama | 349/62 |
| 6,469,754 B1 | * | 10/2002 | Okumura | 349/2 |
| 6,507,159 B2 | * | 1/2003 | Muthu | 315/307 |
| 6,548,808 B2 | * | 4/2003 | Ozawa | 250/239 |
| 6,600,562 B1 | * | 7/2003 | Chang | 356/405 |
| 6,630,801 B2 | * | 10/2003 | Schuurmans | 315/307 |
| 6,648,486 B2 | * | 11/2003 | Harbers et al. | 362/31 |
| 6,667,499 B1 | * | 12/2003 | Furumiya | 257/225 |
| 2002/0030775 A1 | * | 3/2002 | De Schipper | 349/113 |
| 2002/0043613 A1 | * | 4/2002 | Suzuki et al. | 250/214.1 |

FOREIGN PATENT DOCUMENTS

| | | | | |
|---|---|---|---|---|
| JP | 11-260572 | | 9/1999 | |
| JP | 11260572 A | * | 9/1999 | .......... H05B 37/02 |

* cited by examiner

Primary Examiner—Stephen Husar
Assistant Examiner—Jason Han
(74) Attorney, Agent, or Firm—Oblon, Spivak, McClelland, Maier & Neustadt, P.C.

(57) ABSTRACT

A liquid crystal display apparatus has R, G, and B LEDs and a light guide plate for guiding and diffusing the light entering through an incident surface evenly over the plate. The bottom surface of the light guide plate has a diffusion portion where microdot pattern is printed to diffuse incident light. The liquid crystal display apparatus also has an optical sensor for receiving the light exiting from the light guide plate through a side surface, and a light-shielding member mounted in front of the optical sensor. The light-shielding member has pinholes to block the light incident on the optical sensor in the direction from the incident surface to the opposite surface at an incidence angle greater than a given angle. The luminance of the LEDs is controlled based on the light detected by the optical sensor.

17 Claims, 4 Drawing Sheets

PLANAR LIGHT SOURCE DEVICE, LIQUID CRYSTAL DISPLAY APPARATUS, AND DISPLAY APPARATUS

BACKGROUND OF THE INVENTION

1. Field of the Invention

The present invention relates to a planar light source device and a liquid crystal display apparatus using the same.

2. Description of the Related Art

Typical liquid crystal display apparatus used for personal computers and mobile phones include a liquid crystal panel and a planar light source device. The liquid crystal panel has two substrates with a liquid crystal layer interposed therebetween. The planar light source device is mounted on the back of the liquid crystal panel. Conventionally, a linear cold cathode fluorescent lamp has been widely used as a light source of the planar light source device. Recently, however, a light emitting diode (LED) has become increasingly used because of longer life, better color fidelity, and mercury-free operation. When using a monochromatic LED, it is necessary to use different colors of LEDs to produce white light. Often used are three colors of LEDs: red (R), green (G), and blue (B). A liquid crystal display apparatus uses a plurality of each color LEDs to achieve necessary luminance. The number of each color LEDs may be different depending on necessary luminance and desired white point for each of the R, G, and B. The liquid crystal display apparatus further has a light guide plate to guide and diffuse the light emitted by the LEDs evenly over the plate. The plurality of LEDs are placed in a row at the side or bottom of the light guide plate. The light guide plate mixes the three colors of light together to create white light and have the light incident on an exit surface thereof.

The planar light source device using the LEDs, however, has the following problems. Since each color LED has different temperature characteristics, the luminance of each LED varies by changes in ambient temperature. Further, the luminance varies also by changes in time. The luminance varies not only among R, G, and B LEDs but also between the same color LEDs. The luminance variation among the LEDs is significant at an early stage.

The luminance variation among the LEDs generates variation in the luminance or chromaticity of the entire planar light source device. In order to suppress the luminance or chromaticity variation, a planar light source device having an optical sensor at an edge of a light guide plate has been developed. Such a planar light source device is described in Japanese Unexamined Patent Application Publication No. 11-260572, for example. The planar light source device having an optical sensor detects the light from LEDs with the optical sensor and controls the LEDs to keep the luminance constant by feedback based on the detected light. The optical sensor has three types of optical sensor elements for detecting the wavelength corresponding to red, green, and blue light, respectively. Sending feedback to each color LED allows producing desired white light. The luminance and chromaticity of the light from the light sources are thus kept stable to improve display quality.

The planar light source device performing feedback control using the optical sensor, however, has a problem. The problem will be explained hereinafter with reference to FIGS. 8A and 8B. FIG. 8A is a top plan view of a conventional planar light source device. The planar light source device in FIG. 8A has LEDs 1, a light guide plate 2, a reflector 3, and an optical sensor 4. The LEDs are light sources emitting red, green, and blue color light. The light emitted by the LEDs 1 enters the light guide plate 2 directly or after reflected by the reflector 3. The light travels through the light guide plate 2, is diffused evenly over the plate, and then exits from the light guide plate 2 through an exit surface which faces toward a liquid crystal panel (not shown). The optical sensor 4 for detecting the light from LEDs 1 is mounted at the side of the light guide plate 2 to make the display device thinner. The optical sensor 4 has three types of optical sensor elements for detecting red, green, and blue light, respectively. The feedback control is performed to maintain a constant luminance based on detection signals from the optical sensor 4.

The light emitted by the LEDs 1 is directional. The emission angle distribution, for example, is such that the light intensity is highest at the normal to the LED and decreases as an angle off the normal increases. In the light guide plate 2, the light incident on the side surface of the plate at a smaller angle than a given angle is totally reflected. The light incident at a greater angle than a given angle, on the other hand, exits from the light guide plate 2. Therefore, the intensity of the light exiting through the side surface of the light guide plate 2 reflects the emission angle distribution of the light from the LEDs. Thus, the obliquely incident light from a specific LED 1 shown by an arrow in FIG. 8A has high intensity. The optical sensor 4 therefore detects the light greatly affected by a specific LED 1. As a result, the luminance variation of a specific LED 1 is detected as the luminance variation of the entire light source device. Feedback control based on such a detection result from the optical sensor 4 fails to keep the luminance and chromaticity of the entire planar light source device constant. This problem is more significant when the optical sensor 4 is placed on the side surface of the light guide plate opposite to the side surface where the LEDs 1 are mounted since the light intensity is highest at the normal to the LED 1. Accordingly, the planar light source using the LEDs 1 and having the optical sensor on a surface which is neither a display surface nor the surface opposite to the display surface is incapable of accurate feedback. The luminance and the chromaticity therefore vary with temperature or time, resulting in varying emission characteristics. A liquid crystal display apparatus employing such a planar light source device has varying display characteristics and deteriorated display quality.

As described above, the conventional planar light source device and liquid crystal display apparatus are incapable of accurate control of light from a light source.

SUMMARY OF THE INVENTION

Accordingly, an object of the present invention is to provide a planar light source device and liquid crystal display apparatus capable of accurate control of light from a light source.

A planar light source device according to the present invention includes a plurality of light sources (LEDs 1 in a preferred embodiment of this invention, for example), a light guide plate (a light guide plate 2, for example) for guiding light entering through an incident surface from the plurality of light sources evenly over the light guide plate, and a diffusion portion (a diffusion portion 13, for example) for diffusing incident light, formed on the light guide plate. The planar light source device also includes an optical sensor (an optical sensor 4, for example) for receiving light exiting from the light guide plate through a side surface thereof, and a light-shielding member (a light-shielding member 9, for example) mounted in front of the optical sensor, for blocking light incident on a light-receiving surface of the optical sensor at an incident angle greater than a given angle. The planar light source device thereby controls luminance of each of the plurality of light sources based on light detected by the optical sensor. In this configuration, accurate control of the luminance of the planar light source device is achieved.

The above planar light source device may have a plurality of light sources for emitting different colors of light, and a plurality of optical sensors for detecting different colors of light. This planar light source device thereby controls luminance of each of the plurality of light sources for emitting different colors of light based on light detected by each of the plurality of optical sensors. This configuration allows accurate control of the chromaticity of the planar light source device.

In the above planar light source device, it is preferable that the light-shielding member comprises black resin having a pinhole. This permits accurate control of the luminance of the planar light source device with a simple structure.

The above planar light source device may further include an infrared filter for blocking infrared light, between the optical sensor and the light-shielding member. This allows more accurate control.

Furthermore, it is preferred in the above planar light source device that the plurality of light sources comprise light-emitting diodes.

A liquid crystal display apparatus according to the present invention includes any of the preceding planar light source devices and a liquid crystal panel (a liquid crystal panel 7 in a preferred embodiment of this invention, for example) mounted above the planar light source device. The liquid crystal panel has two substrates with a liquid crystal layer interposed therebetween. In this configuration, accurate control of the luminance of the liquid crystal display apparatus is achieved.

A display apparatus according to the present invention includes a plurality of light sources, a light guide plate for guiding light entering through an incident surface from the plurality of light sources evenly over the light guide plate, and a diffusion portion for diffusing incident light, formed on the light guide plate. The display apparatus also includes an optical sensor mounted on a side surface of the light guide plate which is adjacent to the incident surface on which light from the plurality of light sources is incident, a light-shielding member mounted in front of the optical sensor, for blocking light incident on a light-receiving surface of the optical sensor at an incidence angle greater than a given angle, and a display panel mounted above the light guide plate. The display apparatus thereby controls luminance of each of the plurality of light sources based on light detected by the optical sensor. In this configuration, accurate control of the luminance of the display apparatus is achieved.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

First Embodiment

Figure 1A:
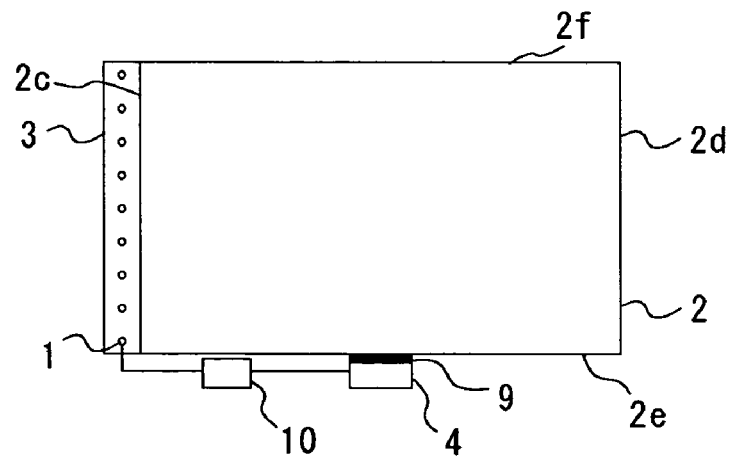
FIG. 1A is a top plan view showing a structure of a liquid crystal display apparatus according to the first embodiment of the present invention.
Figure 1B:
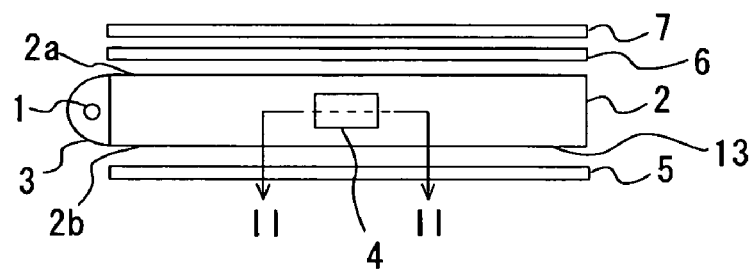
FIG. 1B is a side elevational view showing a structure of the liquid crystal display apparatus according to the first embodiment of the present invention.

A liquid crystal display apparatus according to the present invention will be explained hereinafter with reference to FIGS. 1A and 1B. FIGS. 1A and 1B show the entire structure of the liquid crystal display apparatus. FIG. 1A is a top plan and FIG. 1B is a side elevational view of the liquid crystal display apparatus. The liquid crystal display apparatus has LEDs 1, a light guide plate 2, reflector 3, optical sensor 4, reflection sheet 5, optical sheet 6, liquid crystal panel 7, light-shielding member 9, feedback circuit 10, and diffusion portion 13. The surface of the light guide plate 2 facing toward the optical sheet 6 and the liquid crystal display panel 7 is a top surface 2a, and the surface facing toward the reflection sheet 5 is a bottom surface 2b. The surface where the LEDs 1 are mounted is an incident surface 2c, and the surface opposite to the incident surface 2c is an opposite surface 2d. The surfaces adjacent to the incident surface 2c and the opposite surface 2d are side surfaces 2e and 2f. The structure of the liquid crystal display apparatus using the LEDs 1 as light sources will be described in the following.

The plurality of LEDs 1 are arranged in a row along the incident surface 2c of the light guide plate 2. The LEDs 1 comprise three types: R emitting red light, G emitting green light, and B emitting blue light. Each type emits different wavelength of light. Each of the three colors of LEDs is adjusted to have a given luminance so that the three colors together produce white light. The number of each of R, G, and B LEDs 1 may be different. The position of each of R, G, and B LEDs 1 is determined so that they together produce uniform white light. The reflector 3 is placed along the row of the LEDs 1 opposite to the light guide plate 2. The optical sheet 6 and the liquid crystal panel 7 are placed above the top surface 2a of the light guide plate 2. The reflection sheet 5 is placed below the bottom surface 2b of the light guide plate 2. Those components are fixed by a frame (not shown). A reflection member (not shown) may be placed between the frame and the light guide plate 2 so that the light having exited from the light guide plate 2 reenters the light guide plate 2. The optical sensor 4 is mounted near the center of the side surface 2e of the light guide plate 2. The light-shielding member 9 is placed between the optical sensor 4 and the light guide plate 2. The feedback circuit 10 controls the luminance of the LEDs 1 by increasing or decreasing the current, duty ratio, or voltage to input to the LEDs 1 based on the light detected by the optical sensor 4. The optical sensor 4 may use a photodiode, for example, as a light-receiving element.

The light emitted by the LEDs 1 is incident on the incident surface 2c of the light guide plate 2 directly or after reflected by the reflector 3. The light guide plate 2 is made of polymethyl methacrylate (PMMA) or polycarbonate (PC), for example, and it has the refractive index of approximately 1.5. Entering the light guide plate 2, the light travels through the plate to be diffused evenly over the entire plate. A microdot pattern is printed entirely on the bottom surface 2b of the light guide plate 2 to diffuse incident light. The microdot pattern will be referred to hereinafter as a diffusion portion 13. The light incident on the bottom surface 2b is diffused by the diffusion portion 13 and thereby the three colors of light from the LEDs 1 are mixed together. The diffused light then exits from the light guide plate 2 through the top surface 2a and enters the optical sheet 6. Or, the diffused light exits through the bottom surface 2b, enters the reflection sheet 5, then reenters the light guide plate 2, and finally exits from the light guide plate 2 through the top surface 2a. The optical sheet 6, which comprises a diffusion sheet, protection sheet, prism sheet and so on, processes the incident light and then has the light exit towards the light crystal panel 7. The liquid crystal panel 7 has a thin film transistor (TFT) array substrate and color filter (CF) substrate, between which are filled liquid crystals. In the TFT array substrate, TFTs that are switching elements are formed on a glass substrate. In the CF substrate, a color filter and a light-shielding film are formed on a glass substrate. Desired images are displayed by driving the switching elements. A conventional liquid crystal panel may be used for the liquid crystal panel 7, and therefore the explanation of the panel will be omitted.

The luminance of the LEDs 1 varies with temperature and time. The degree of variation differs among R, G, and B. The variation affects the display characteristics of the display apparatus. To prevent this, feedback control is performed by detecting the intensity of the light exiting through the side surface 2e of the light guide plate 2 using the optical sensor 4. In the feedback control, if the light intensity detected by the optical sensor 4 decreases, the increased current, voltage, or duty ratio is input to the LEDs. If the light intensity increases, on the contrary, the decreased current or voltage is input. The feedback control is performed using the feedback control circuit 10 to maintain constant luminance and chromaticity of the planar light source device. The optical sensor 4 comprises three types of optical sensor elements for detecting R, G, and B light, respectively. A photodiode is used as a light-receiving element in this case. In front of each photodiode is a bandpass filter or light-absorbing color filter (not shown) corresponding to each of R, G, and B wavelength. Detecting light with the optical sensor comprising the three types of optical sensor elements and feeding back the detection results allow maintaining constant luminance of each color light and constant luminance and chromaticity of the entire device.

Figure 2:
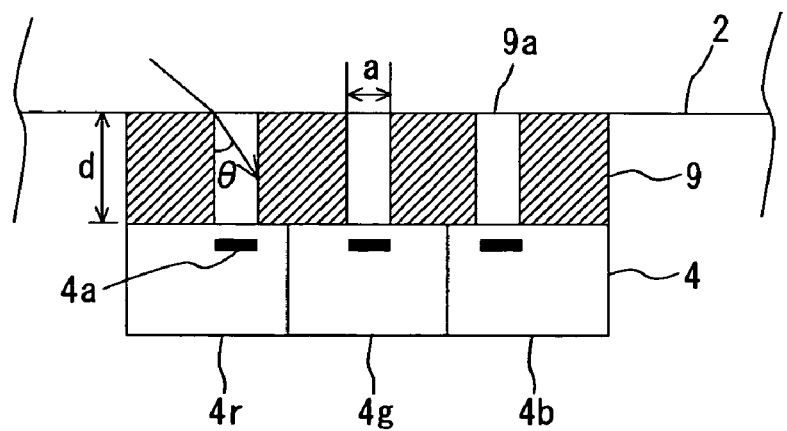
FIG. 2 is an enlarged cross-sectional view along line II—II of FIG. 1B.
Figure 3:
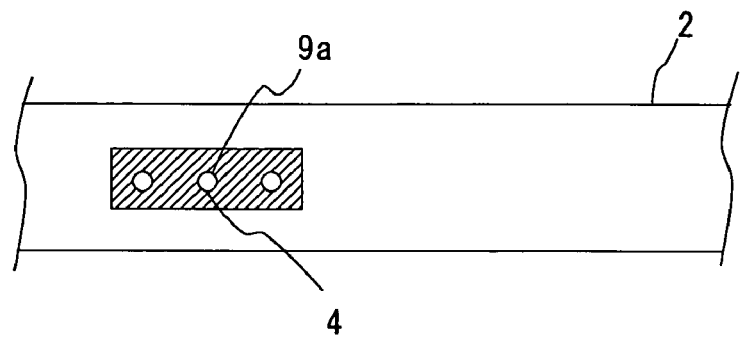
FIG. 3 is a view showing a structure of a light-shielding member used in the liquid crystal display apparatus according to the first embodiment of the present invention.

The light-shielding member 9 is placed between the optical sensor 4 and the light guide plate 2 in this embodiment. The light-shielding member 9 blocks directional light coming from a specific LED 1. The light-shielding member 9 will be explained hereinbelow with reference to FIGS. 2 and 3. FIG. 2 is an enlarged cross-sectional view along line II—II of FIG. 1B. FIG. 3 shows the light-shielding member 9 viewed from the light guide plate. The same reference numerals as in FIGS. 1A and 1B designate the same elements, and the redundant description will be omitted. Light-receiving elements 4a are built into light-receiving surfaces of the optical sensor elements of the optical sensor 4. The light-shielding member 9 has pinholes 9a.

The light-shielding member 9 is mounted in front of the optical sensor 4. The optical sensor 4 has optical sensor elements 4r, 4g, and 4b for detecting the wavelengths corresponding to R, G, and B light, respectively. The light-shielding member 9 has the pinholes 9a in front of the light-receiving elements 4a of the optical sensor 4 as shown in FIG. 3. The pinholes 9a are provided in front of the light-receiving elements 4a corresponding to R, G, and B light to prevent the light incident on the light-shielding member 9 at an incidence angle greater than a given angle from entering the optical sensor 4. Therefore, the light incident on the pinholes 9a crosswise at an angle greater than a given angle is incident on the light-shielding member 9 at the middle of the pinholes 9a as shown in an arrow in FIG. 2. The crosswise direction is the direction from the incident surface 2c to the opposite surface 2d. The incidence angle is the angle between the incident light and the normal to the side surface 2e. The light-shielding member 9 is formed by black resin and absorbs incident light. Accordingly, only the light having passed through the pinholes 9a reaches the light-receiving elements 4a to be detected by the optical sensor 4. When the length and diameter of the pinhole are d and a respectively, the light incident on the pinhole 9a at the incidence angle of tan θ>a/d is absorbed by the light-shielding member 9. The light thus fails to reach the light-receiving elements 4a of the optical sensor 4. On the other hand, the light incident at the incidence angle of tan θ≦a/d reaches the light-receiving elements 4a. The optical sensor 4 thus detects the light incident on the pinhole 9a at the angle of tan θ≦a/d. As described above, the light-shielding member 9 with the pinholes 9a can block the light entering the optical sensor 4 crosswise at an angle greater than a given angle. The sizes of the pinholes 9 for R, G, and B light may be different.

The angular distribution of the incident light on the light-shielding member 9 will be explained hereinbelow. First, the light incident on the light-shielding member 9 without entering the diffusion portion 13 on the bottom surface 2b of the light guide plate 2 will be explained. The light emitted by the LEDs is directional. The light enters the light guide plate 2 through the incident surface 2c and travels through the plate. While traveling through the plate, the light incident on the side surfaces 2e and 2f, incident surface 2c, and opposite surface 2d at an angle greater than a given angle is totally reflected, maintaining the same angular distribution. On the other hand, the light incident thereon at an angle smaller than a given angle exits from the light guide plate 2 because it does not satisfy the total reflection condition. The exiting light is then reflected by a reflector mounted on the periphery of the light guide plate 2 and reenters the plate. Repeatedly reflected by the side surfaces 2e and 2f, incident surface 2c, and opposite surface 2d of the light guide plate 2, the light from the LEDs 1 travels over the entire plane, maintaining the directivity. Thus, the light exiting from the light guide plate 2 includes the light with higher intensity coming from a specific LED 1. The light exiting from the light guide plate 2 through the side surface 2e near the optical sensor 4 remains directional. Accordingly, the light is incident on the light-shielding member 9 at the angle which reflects the angular distribution of the LEDs 1. Therefore, the light from a specific LED 1 incident on the light-shielding member at a given incidence angle has higher intensity than other light.

In this embodiment, the side surface 2e where the optical sensor 4 is mounted and the incident surface 2c where the light from the LEDs 1 is incident are adjacent. Since the light emitted by the LEDs 1 is directional, the light incident on the light-shielding member 9 crosswise has higher intensity than other light. This is the same for the light incident on the light-shielding member 9 in the direction from the opposite surface 2d to the incident surface 2c after reflected by the side surface 2f and the opposite surface 2d of the light guide plate 2. Further, the intensity of the light emitted by the LEDs 1 at an angle close to the normal is high. Accordingly, the intensity of the light from a specific LED 1 obliquely incident on the light-shielding element 9 is higher than that of the light from other LEDs 1. On the other hand, the intensity of the light emitted by the LEDs 1 at a greater angle from the normal is low. Thus, the intensity of the light emitted by the LEDs at a large angle, repeatedly reflected by the side surfaces 2f and 2e of the light guide plate 2, and then incident almost perpendicularly on the light-shielding member 9 is significantly low. Since the light-shielding member 9 is formed by black resin which absorbs light, the light obliquely incident on the light-shielding member 9 at an angle greater than a given angle is unable to pass the pinholes 9a but is absorbed by the light-shielding member 9. This configuration prevents the obliquely incident light with high intensity coming from a specific LED 1 from entering the optical sensor 4. The incident intensity on the optical sensor 4 is thereby equalized between the light from a specific LED and the light from other LEDs 1.

Next, the light incident on the light-shielding member 9 after entering the diffusion portion 13 will be explained. The light incident on the bottom surface 2b of the light guide plate 2 is diffused by the diffusion portion 13, changing the angular distribution. The diffused light is reflected in random directions, or exits from the light guide plate 2 and reenters the plate after reflected by the reflection sheet 5. The light thereby becomes non-directional and travels through the plate. Further, as the light is diffused, the three colors are mixed together to produce white light. Thus, the angular distribution of the diffused light does not reflect that of the LEDs 1. Accordingly, when detecting the light diffused by the diffusion portion 13 with the optical sensor 4, the result is not affected by a specific LED. Therefore, detecting the light diffused by the diffusion portion 13 with the optical sensor 4 allows more accurate sensing in the planar light source device. This is achieved by detecting the light diffused in the direction almost perpendicular to the side surface 2e of the light guide plate 2 and capable of passing through the pinholes 9a. The incident light coming from a specific LED 1 with high directivity is thereby removed, which enables more accurate control of the luminance of the planar light source device.

As explained above, this embodiment allows blocking the obliquely incident light with high intensity and directivity from a specific LED 1. Accurate control of the luminance of the light source device is thereby achieved without substantially affected by varying luminance of the specific LED 1. The luminance of the planar light source device can be kept constant by feedback control based on the output from the optical sensor 4 mounted on the side surface 2e or 2f. In this embodiment, the light-shielding member 9 has the pinholes 9a placed in front of the light-receiving elements corresponding to R, G, and B light, respectively. The feedback control using the optical sensor 4 comprising the three types of optical sensor elements allows keeping the luminance of each color light constant, thereby maintaining constant luminance and chromaticity. The emission characteristics of the planar light source device are thus stabilized to improve the display quality of the liquid crystal display apparatus.

Figure 4:
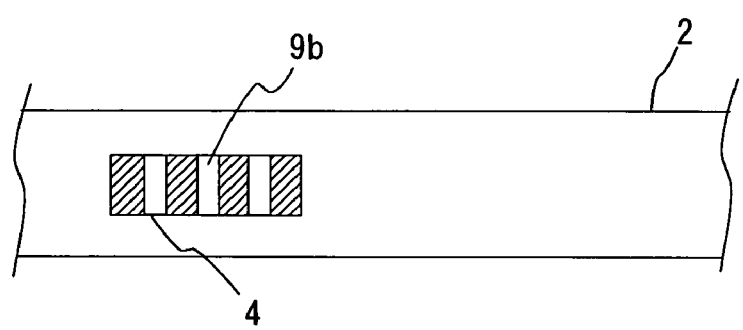
FIG. 4 is a view showing another structure of the light-shielding member used in the liquid crystal display apparatus according to the first embodiment of the present invention.
Figure 5:
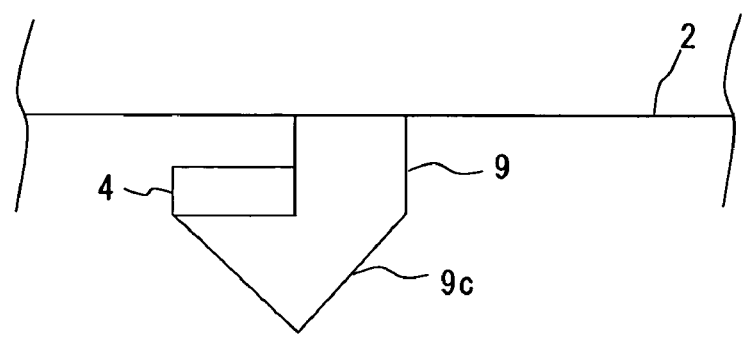
FIG. 5 is a view showing another structure of the light-shielding member used in the liquid crystal display apparatus according to the first embodiment of the present invention.

In this invention, the light-shielding member 9 is not limited to those having the pinholes 9a. Two embodiments in which the pinholes 9a are replaced by an alternative will be explained hereinafter with reference to FIGS. 4 and 5. FIG. 4 shows the optical sensor 4 viewed from the light guide plate 2, like FIG. 3. FIG. 5 is an enlarged cross-sectional view along line II—II of FIG. 1B, like FIG. 2. The light-shielding member 9 shown in FIG. 4 has slits 9a, and that shown in FIG. 5 has a right-angle prism 9c. The light-shielding member 9 having the horizontal slits 9b shown in FIG. 4 also allows restricting the incident light angle, providing the same effect. In this case, the amount of light to enter the optical sensor 4 increases and thereby the detection sensitivity is enhanced. The shape of the openings to allow the light to pass through is not necessarily pinholes or slits, and various shapes including slotted holes and square holes may be employed. The use of the black resin permits restricting the incident light with a simple structure. This reduces device cost and manufacturing process. The color and material of the light-shielding member 9, however, are not limited to black and resin. For example, a mirror-finished outer surface increases light use efficiency. Material other than resin may be used. The opening diameter and length of the light-shielding member 9 are determined according to the detection sensitivity of the optical sensor 4, the luminance of the LEDs 1, the angular distribution of the LEDs 1, the positions of the LEDs 1 and the optical sensor 4, the refraction index and size of the light guide plate 2, and so on. The light-shielding member 9 does not necessarily contact the light guide plate 2.

Further, the light-shielding member 9 may have the right-angle prism 9c as shown in FIG. 5. When using the right-angle prism 9c, the light incident at an angle close to a right angle is totally reflected twice to reach the optical sensor 4. The light incident at an angle greater than a given angle, on the other hand, is not totally reflected and exits from the right-angle prism 9c. Accordingly, the use of the right-angle prism 9c having the shape shown in FIG. 5 allows restricting the light incident on the optical sensor 4 crosswise at an angle greater than a given angle, therefore providing the same effect. In this case, the angle that the incidence on the optical sensor 4 is restricted changes according to the refraction index of the prism. This is the same for the use of another-shaped prism. In this case, the incidence angle to be restricted can be adjusted also by the angle of prism. The same effect can be obtained when using the right-angle prism 9c as the light-shielding member 9. As described above, various shapes and materials may be used for the light-shielding member 9.

Second Embodiment

Figure 6:
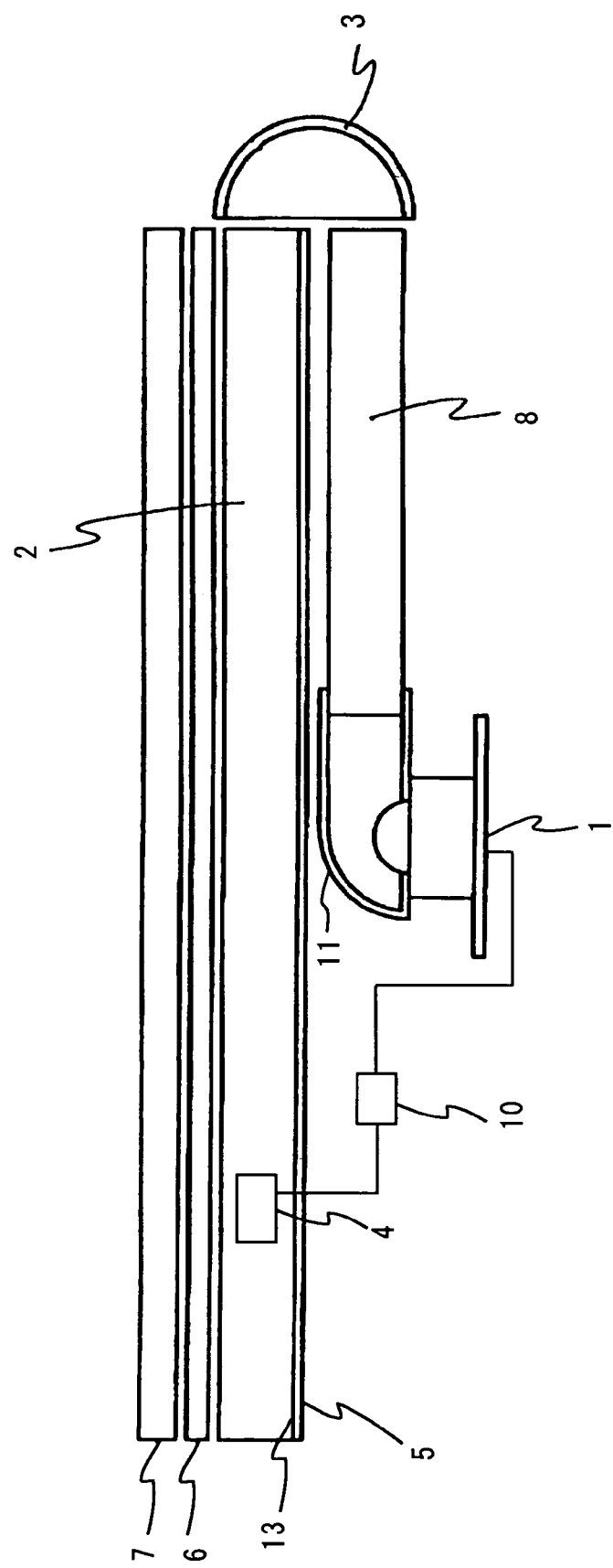
FIG. 6 is a sectional view showing a structure of a liquid crystal display apparatus according to the second embodiment of the present invention.

A liquid crystal display apparatus according to the second embodiment of the present invention will be explained hereinafter with reference to FIG. 6. FIG. 6 is a cross-sectional view of the liquid crystal display apparatus. The same reference numerals as in FIGS. 1A and 1B designate the same elements, and redundant description will be omitted. The liquid crystal display apparatus in FIG. 6 has a color mixing light guide plate 8 and a reflector 11.

Although the overall structure of this embodiment is different from that of the first embodiment, the structure and position of the optical sensor 4 are the same, and hence the explanation on the optical sensor will be omitted. The differences between this embodiment and the first embodiment will be explained in the following. In this embodiment, the LEDs 1 are placed underneath the center of the light guide plate 2. The reflector 11 is formed above the LEDs 1. The color mixing light guide plate 8 is placed at the side of the reflector 11. Those are fixed with other components by a frame (not shown) as with the case with the first embodiment.

The light emitted by the LEDs 1 enters the color mixing light guide plate 8 through the side surface directly or after reflected by the reflector 11. The color mixing light guide plate 8 mixes R, G, and B colors of light to create substantially white light. The light then exits from the color mixing light guide plate 8 through the side surface opposite to the side surface where the LEDs 1 are mounted nearby. The light is reflected by the reflector 3 and enters the light guide plate 2. The other components including the liquid crystal panel and optical sheet are the same as those in the first embodiment, and the explanation will be omitted. The optical sensor 4, light-shielding member 9, and feedback circuit 10 are also the same as those in the first embodiment and thus not explained here. As described above, the liquid crystal display apparatus having the LEDs 1, light-mixing light guide plate 8, and reflector 11 underneath the light guide plate 2 can provide the same effect.

Third Embodiment

Figure 7:
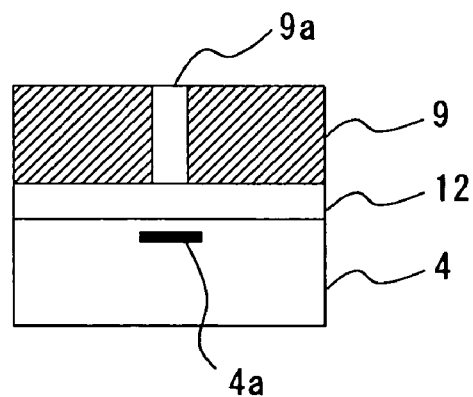
FIG. 7 is a sectional view showing a structure of an optical sensor used in the third embodiment of the present invention.
Figure 8A:
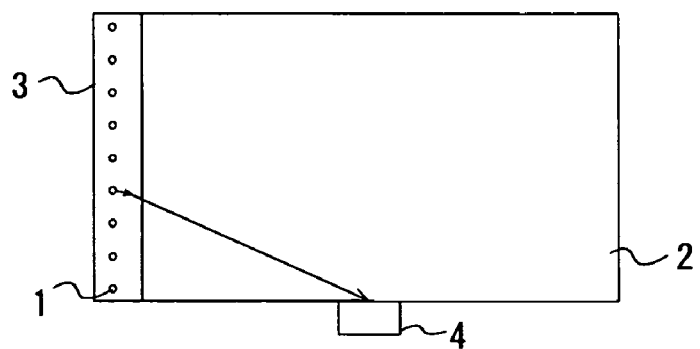
FIGS. 8A and 8B are views showing a structure of a conventional liquid crystal display apparatus.
Figure 8B:
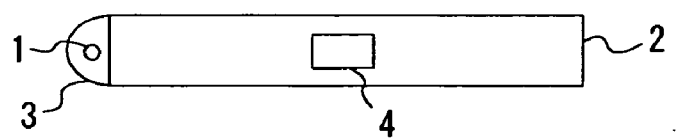

An optical sensor used in a liquid crystal display apparatus according to the third embodiment of the present invention will be described hereinafter with reference to FIG. 7. FIG. 7 is a cross-sectional view showing a structure of the optical sensor. The same reference numerals as in FIGS. 1A and 1B designate the same elements, and therefore redundant description will be omitted. As shown in FIG. 7, the liquid crystal display apparatus in this embodiment has an infrared filter 12. The overall structure of the liquid crystal display apparatus in this embodiment is the same as that in the first embodiment, and thus the explanation will be omitted. This embodiment is different from the first embodiment in the structure of the optical sensor 4. The difference will be explained in the following.

In this embodiment, the infrared filter 12 is mounted in front of the optical sensor 4. The infrared filter 12 prevents infrared light from entering the optical sensor 4. If the infrared light is incident on the light-receiving elements 4a of the optical sensor 4, the optical sensor 4 detects it. The infrared filter 12 allows blocking the infrared light generated in the vicinity of the optical sensor 4 such as the light guide plate 2 and the light-shielding member 9. The light from the LEDs 1 can be thereby detected more accurately. Especially, the intensity of the light detected is not affected by the temperature of the light-shielding member 9 and the light guide plate 2, thus achieving accurate detection. Accordingly, the planar light source device is accurately controlled to improve the display characteristics of the liquid crystal display apparatus.

This embodiment uses the light-shielding member 9 having the pinholes 9a. The use of the infrared filter 12 can attenuate the visible light (R, G, and B) transmitting through the infrared filter 12. This embodiment uses the light-shielding member 9 with the pinholes 9a for the following reasons. The pinholes 9a restrict incidence angles not only in the crosswise direction, but also in the lengthwise direction. Therefore, the path length of the light passing through the light-shielding member 9 to reach the light-receiving elements 4a of the optical sensor 4 is substantially constant, though it is not constant when using the slits or the right-angle prism. Accordingly, the degree of attenuation of the visual light when passing through the infrared filter 12 is substantially constant regardless of the incidence angle. More accurate detection of light is thereby achieved.

Other Embodiments

Although the above embodiments explain the case where the present invention is applied to liquid crystal display apparatus, it is also applicable to planar light source devices. Further, this invention is not restricted to the above embodiments, and various changes may be made. For example, the diffusion portion 13 is not limited to the microdot pattern, and it may be formed by surface roughing such as sandblasting and embossing. Further, the diffusion portion 13 is not limited to be formed on the bottom surface of the light guide plate 2, and it may be formed on the top surface. The diffusion portion 13 is not necessarily formed on the entire plane.

Though the above embodiments use R, G, and B LEDs as light sources, this invention is not restricted thereto. For example, cyan, magenta, and yellow, or other colors of LEDs may be used. Sensing each color and feedback the result allow keeping the luminance and chromaticity of the liquid crystal display apparatus constant. In this case, the optical sensor may comprise the optical sensor elements for detecting the wavelength corresponding to each color light, not limited to R, G, and B light. Further, the optical sensor is not limited to those comprising the optical sensor elements corresponding to three colors of light, and it may comprise the optical sensor elements corresponding to two or more colors of light. Furthermore, the light sources are not limited to three colors, and two colors or single color of light source may be used. For example, accurate detection of the light of the entire device, regardless of varying luminance of a specific light source, is achieved also when using a plurality of single color light sources. In this case, the optical sensor does not need to have optical sensor elements for each color. Performing feedback control in this configuration allows accurate control of the luminance, thereby improving the display characteristics of the liquid crystal display apparatus.

Besides, the R, G, and B optical sensor elements of the optical sensor 4 may be placed in any arrangement. For example, they may be arranged in a vertical row. Further, each color of the optical sensor elements may be placed in a different position or surface. Though the optical sensor 4 is placed near the center of the side surface 2e in the above embodiments, it may be placed closer to the incident surface 2c or the opposite surface 2d. Or, the optical sensor 4 may be placed on the side surface of the color mixing light guide plate 8 in the second embodiment. The LEDs 1 are preferably distant from the incident surface 2c and the opposite surface 2d to reduce the light that is reflected by the incident surface 2c or the opposite surface 2d and incident almost perpendicularly on the side surface 2e. Thus, the optical sensor 4 is preferably placed near the center of the side surface 2e. The LEDs 1 are not necessarily mounted on the incident surface 2c of the light guide plate 2 and may be mounted on the opposite surface 2d. Further, they may be mounted on both the incident surface 2c and the opposite surface 2d.

The liquid crystal display apparatus according to the present invention has the optical sensor for detecting light on the side surface of the light guide plate and the light-shielding member for blocking the light incident crosswise at an angle greater than a given angle. The display apparatus feeds back the detection results and adjusts the luminance of the light sources based on them. The luminance and chromaticity of the liquid crystal display apparatus can be thereby kept constant even when the light from the light sources vary with time and temperature. The present invention is suitable for use with a point light source having high directivity such as a LED. The same effect can be obtained when the LED is provided with a lens for wider light emission angle or when the incident surface has a prism structure. Further, the light source is not limited to the LED as described in the above embodiments. For example, a cold cathode fluorescent lamp or electroluminescent lamp may be used as the light source. If those light sources are provided in plural numbers, feedback control can be performed, reducing the effect of a specific light source. Accurate control of the light of the entire planar light source is thereby achieved to improve the quality of the display apparatus.

As described above, the present invention provides the planar light source device and the liquid crystal display apparatus capable of accurate detection of light using the optical sensor.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A planar light source device comprising:
    a plurality of light sources;
    a light guide plate for guiding light entering through an incident surface from the plurality of light sources evenly over the light guide plate;
    a diffusion portion for diffusing incident light, formed on the light guide plate;
    an optical sensor for receiving light exiting from the light guide plate through a side surface thereof; and
    a light-shielding member mounted in front of the optical sensor, for blocking light incident on a light-receiving surface of the optical sensor at an incident angle greater than a given angle;
    wherein luminance of each of the plurality of light sources is controlled based on light detected by the optical sensor.

2. A planar light source device according to claim 1, comprising:
    a plurality of light sources for emitting different colors of light; and
    a plurality of optical sensors for detecting different colors of light,
    wherein luminance of each of the plurality of light sources for emitting different colors of light is controlled based on light detected by each of the plurality of optical sensors.

3. A planar light source device according to claim 2, wherein the light-shielding member comprises black resin having a pinhole.

4. A planar light source device according to claim 2, further comprising:
    an infrared filter for blocking infrared light, placed between the optical sensor and the light-shielding member.

5. A planar light source device according to claim 2, wherein the plurality of light sources comprise light-emitting diodes.

6. A liquid crystal display apparatus comprising:
    a planar light source device according to claim 2; and
    a liquid crystal panel mounted above the planar light source device, comprising two substrates with a liquid crystal layer interposed therebetween.

7. A planar light source device according to claim 1, wherein the light-shielding member comprises black resin having a pinhole.

8. A planar light source device according to claim 7, further comprising:
    an infrared filter for blocking infrared light, placed between the optical sensor and the light-shielding member.

9. A planar light source device according to claim 7, wherein the plurality of light sources comprise light-emitting diodes.

10. A liquid crystal display apparatus comprising:
    a planar light source device according to claim 7; and
    a liquid crystal panel mounted above the planar light source device, comprising two substrates with a liquid crystal layer interposed therebetween.

11. A planar light source device according to claim 1, further comprising:
    an infrared filter for blocking infrared light, placed between the optical sensor and the light-shielding member.

12. A planar light source device according to claim 8, wherein the plurality of light sources comprise light-emitting diodes.

13. A liquid crystal display apparatus comprising:
    a planar light source device according to claim 11; and
    a liquid crystal panel mounted above the planar light source device, comprising two substrates with a liquid crystal layer interposed therebetween.

14. A planar light source device according to claim 1, wherein the plurality of light sources comprise light-emitting diodes.

15. A liquid crystal display apparatus comprising:
    a planar light source device according to claim 14; and
    a liquid crystal panel mounted above the planar light source device, comprising two substrates with a liquid crystal layer interposed therebetween.

16. A liquid crystal display apparatus comprising:
    a planar light source device according to claim 1; and
    a liquid crystal panel mounted above the planar light source device, comprising two substrates with a liquid crystal layer interposed therebetween.

17. A display apparatus comprising:
    a plurality of light sources;
    a light guide plate for guiding light entering through an incident surface from the plurality of light sources evenly over the light guide plate;
    a diffusion portion for diffusing incident light, formed on the light guide plate;
    an optical sensor mounted on a side surface of the light guide plate which is adjacent to the incident surface on which light from the plurality of light sources is incident;
    a light-shielding member mounted in front of the optical sensor, for blocking light incident on a light-receiving surface of the optical sensor at an incidence angle greater than a given angle; and
    a display panel mounted above the light guide plate,
    wherein luminance of each of the plurality of light sources is controlled based on light detected by the optical sensor.

* * * * *